United States Patent [19]
Olsson

[11] Patent Number: 4,754,824
[45] Date of Patent: Jul. 5, 1988

[54] METHOD AND APPARATUS FOR STEERING A VEHICLE

[75] Inventor: Gunnar Olsson, Örnsköldsvik, Sweden

[73] Assignee: AB Hagglund & Soner, Ornskoldsvik, Sweden

[21] Appl. No.: 7,205

[22] Filed: Jan. 27, 1987

[30] Foreign Application Priority Data

Jan. 24, 1986 [SE] Sweden .................... 8600325

[51] Int. Cl.$^4$ .......................................... B62D 11/04
[52] U.S. Cl. ................................. 180/6.48; 180/6.2
[58] Field of Search ....................... 180/6.2, 6.3, 6.48

[56] References Cited

U.S. PATENT DOCUMENTS 4,023,637 5/1977 Jackovich .................... 180/6.48
4,372,408 2/1983 Chatterjea .................... 180/6.2

Primary Examiner—John J. Love
Assistant Examiner—Donn McGiehan
Attorney, Agent, or Firm—Pollock, Vande Sande & Priddy

[57] ABSTRACT

The present invention relates to a method and an arrangement for steering of vehicle of the kind which is constructed to be steered for straight ahead movement or for turning to the left or to the right in response to activation of a steering device, by causing left and right traction devices on the vehicle to move at mutually the same speed or at mutually different speeds.

When carrying out the method according to the invention, or when using an arrangement constructed in accordance therewith, steering is effected through the activation of clutch devices and brake devices on the vehicle, by establishing pressure changes in individual hydraulic steering control pressures, in a direction dependent on the result of a comparison made between a steer control set-point value and a steer control real-value. In this regard, the steer control real-value is generated with the aid of sensors which detect the rotational speed of the left and right traction devices of the vehicle. According to the invention, pressure changes are primarily effected in a hydraulic steering control pressure for one clutch device, while pressure changes in the hydraulic steering control pressure for a brake device associated with the same traction device as the aforementioned one clutch device are effected in a manner such that no braking effect is established until a given total change in the hydraulic steering pressure for the brake device is found insufficient to steer the vehicle in the manner desired.

4 Claims, 3 Drawing Sheets

METHOD AND APPARATUS FOR STEERING A VEHICLE

TECHNICAL FIELD

The present invention relates to a method and an arrangement for controlling the steering of a road vehicle. A method and an arrangement according to the invention are intended for vehicles of the kind in which steering of the vehicle for straight ahead movement or for left or right turns, in response to manipulation of a steering device, is effected by causing left and right traction devices on the vehicle to move at mutually the same speed or at mutually different speeds. Such steering is normally found with track-laying vehicles.

BACKGROUND PRIOR ART

Track-laying vehicles of the kind which, in response to the manipulation of a steering device, are steered for straight ahead movement or for movement to the left or to the right, by moving the tracks at mutually the same speed or at mutually different speeds in relation to the body of the vehicle have long been known in the art. Normally, such track-laying vehicles are provided with clutch and brake devices which are capable of effecting variable power transmission and braking effect between a drive motor and the left or right track respectively, and the vehicle body. Perhaps the simplest method of accomplishing a right or a left turn with such vehicles is to completely disengage the right or the left track respectively from the drive motor, while at the same time applying a heavy braking action through the vehicle braking system. Such two-and-fro steering is relatively jerky and, in some cases, not particularly suitable.

It is known, for instance, from JP No. 56-75977 and U.S. Pat. No. 3,727,710, for the purpose of steering vehicles of this kind to detect the speeds of the right and left wheels or tracks, and to compare the detected speeds with a desired steering effect. The clutch or brakes of the vehicle are then controlled in a manner dependent on the result obtained by the comparison, in order to establish between the right and left wheels or tracks a speed differential which correpsonds to the steering desired.

When steering a vehicle of this kind it is difficult to utilize the ground friction to an optimum extent and, at the same time, to establish continuously variable steering which can be changed and adjusted readily in accordance with the characteristics of the vehicle and the nature of the ground on which the vehicle is driven. Another problem is one of utilizing both clutch and brake devices of the vehicle in an optimal manner for steering purposes.

SUMMARY OF THE INVENTION

One object of the present invention is to provide a vehicle steer control which will enable the vehicle to be steered gently and with a variable radius of curvature when making a left and a right turn.

Another object of the present invention is to provide a steering control method and arrangmenet in which both the clutch devices and hte brake devices of the vehicle co-act with one another and are utilized in an optimal manner.

A further object of the present invention is to enable the ground friction to be utilized to an optimum when steering the vehicle, and to retain steering ability even when driving on loose ground and downhill.

Still another object of the invention is to provide a vehicle steering method and arrangement which can be adapted quickly and simply to suit mutually different vehicles in an economic manner.

In accordance with a method and an arrangement according to the present invention, the clutch devices and the brake devices are activated by effecting prssure changes in separate hydraulic steering control pressures in a directional sense dependent on the result of a comparison made between a steer control set-point value and a steer control real, or observed, value, which is produced with the aid of signals representing the speeds at which the vehicle traction devices move. In this regard, pressure changes are firstly effected in a hydraulic steering control pressure for a clutch associated with the left or the right traction devices, while pressure changes in the hydraulic steering control pressure for a brake device associated with the same traction device, such as to establish a braking action, are not effected unitl given pressure changes in the hydraulic steering control pressure for the clutch device have been found insufficient to move the vehicle in the manner desired. In accordance with one embodiment, pressure increases are effected in respective hydraulic steering control pressures between a minimum value and a maximum value for as long as the comparison indicates that the total steering control pressure is too small for the steer control real value to coincide with the steer control set-point value, while pressure decreases are effected in said steering control pressures for as long as the comparison indicates that the total steering control pressure is too high for steer control real value to coincide with the steer control set-point value.

An arrangement according to the present invention incorporates sensors for generating signals representing the speeds at which the left and right traction devices move, real value means for generating a steer control real value with the aid of signals produced by the sensors, set-point value means for generating a set-point value, comparison means for comparing the steer control real value with the steer control set-point value, and fluid pressure control means for changing the hydraulic steering control pressures for the clutch and brake devices incrementally in response to the result obtained by said comparison.

It is particularly important in this connection that the pressure changes are effected in hydraulic steering control pressures and not pneumatic steering control pressures, and that the pressure changes are preferably effected substantially incrementally at a given tempo, i.e. the steering pressures are stepped up or down at a given rate.

The characteristic features of a vehicle steering method or arrangement in accordance with the present invention are set forth in respective Claims 1 and 7. The characterizing features of further developments of the invention are set forth in the depending claims.

COMPLETE DESCRIPTION OF THE INVENTION AND PREFERRED EMBODIMENTS THEREOF

Figure 1:
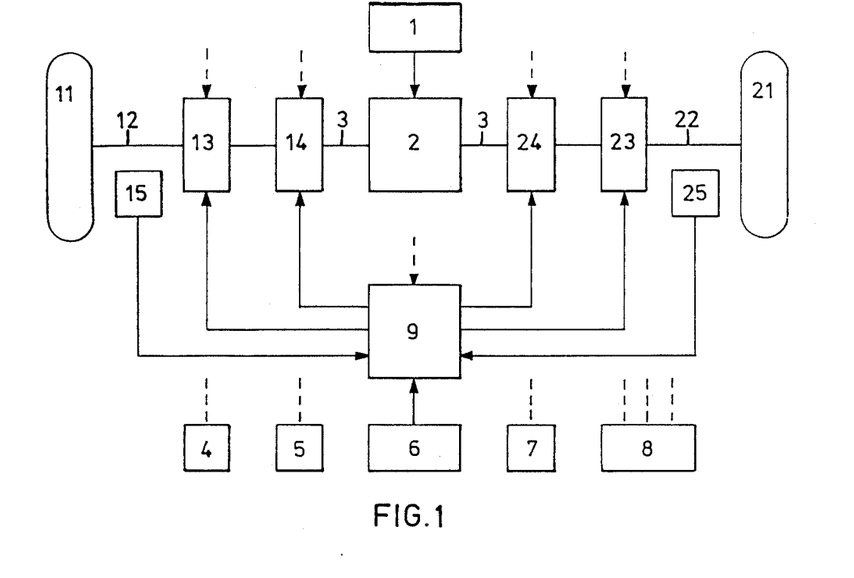
FIG. 1 is a block diagram which illustrates in a highly simplified fashion parts of a motor vehicle and an arrangement for steering the vehicle in accordance with the invention, and also illustrates the manner in which the vehicle and the arrangement co-act with one another.

FIG. 1 is a block diagram which illustrates the vehicle components that may be of particular interest in connection with the present invention, and which also illustrates an exemplifying embodiment of an arrangement according to the invention. Vehicle movement is effected through the movement of separate left and right traction devices 11 and 21, e.g. drive wheels or tracks. The traction devices are driven by a drive motor 1, through power transmission means 2, 3, 12 and 22, e.g. a gear box and drive shafts. A left clutch device 14 and a right clutch device 24 are provided for establishing variable power transmission between the drive motor 1 and the left and right traction devices respectively. The vehicle is also equipped with left and right brake devices referenced 13 and 23 respectively, which are arranged to apply a respective variable braking effect on the left and right traction devices. The clutch and brake devices can be operated by fluid pressures, and to this end the vehicle is provided with a fluid pressure source 8, a clutch pedal or like control 4, and a brake pedal or corresponding control 5. The vehicle also includes a fuel control device 7 and a steering device, for example a steering wheel 6. The vehicle is of the kind which is driven straight forwards or turned to the left or to the right by moving the left and right traction devices at mutually the same speed or by creating a driving speed differential between said left and right traction devices. Such road vehicles are, in themselves, well known, the mutually equal driving speeds of or the driving speed differential between said traction devices being effected through commensurate activation of the clutch and/or the brake devices. Consequently, it is not necessary to describe the vehicle in any great detail.

The FIG. 1 illustration of an embodiment of an arrangement according to the invention includes a control unit 9 and left and right sensors 15 and 25 respectively, for generating signals representing the speeds at which the left and right traction devices move. When, for example, the traction devices comprise a drive wheel, with or without tracks, the sensors may have the form of rotational speed sensors for detecting the rotational speed of the drive wheel about respective drive shafts 12, 22. The sensors are connected to the control unit, which incorporates real-value means for generating at least one steer control real-value with the aid of the signals produced by the sensors. For example, a steer control real-value may represent the differences in rotational speeds, when the sensors are rotational speed sensors. The control unit also incorporates set-point means for producing a steer control set-point value with the aid of the steering device, and further incorporates comparison means for comparing the steer control real-value with the steer control set-point value. The nature of the set-point value means is, of course, dependent to some extent on the steering device used. For example, when the steering device is in the form of a steering wheel, the set-point value means may comprise a sensor which detects the angle through which the wheel is turned. Coaction of the steering device with the control unit is illustrated in FIG. 1, with the aid of the arrow drawn from the block 6 to the block 9. The control unit is intended to regulate the pressure of the steering control fluid for the clutch and/or brake devices of respective left and right traction devices in response to the sensed steer control real-value and to the steer control set-point value, so that the steer control real-value approaches the steer control set-point value. To this end an arrangement according to the present invention includes fluid pressure regulating means which are active to change the hydraulic steering control pressure, preferably incrementally, at a given rate or tempo in a directional sense dependent on the result of the comparison made between the steer control real-value and the steer control set-point value. This is illustrated in FIG. 1 by the individual arrows drawn from the control unit 9 to each of the brake devices 13 and 23, and to each of the clutch devices 14 and 24. The control unit may influence these devices in various ways. According to one embodiment, the control unit is supplied with hydraulic oil under high pressure from the fluid pressure source, as illustrated by the broken-line arrow drawn to the control unit. In this embodiment, the control unit includes four fluid pressure regulating devices which, in response to the steering desired, deliver hydraulic oil at steering control pressure to one of the clutch devices and optionally also to one of the brake devices. In this case, the arrows extending from the control unit represent hydraulic pipes or lines. According to another embodiment, the clutch and brake devices are, instead, supplied with high-pressure hydraulic oil from the fluid pressure source, as illustrated by the broken-line arrows drawn to these devices. In this embodiment, a fluid pressure regulating means is provided for each of the clutch devices 14 and 24 and the brake devices 13 and 23. Each fluid pressure regulating means is steered by the control unit so that one of the clutch devices, and optionally also one of the brake devices is operated at steering pressure while the remaining devices are not steered. In this case, the arrows extending from the control unit represent, for instance, electric control conductors for steering or controlling respective fluid pressure regulating means. Other embodiments are also conceivable. The essential factor is that a change is effected in the hydraulic steering control pressures for the clutch and brake devices, and that these pressures are changed incrementally at a given rate or tempo, in a directional sense conditioned by the result of the comparison made between the steer control real-value and the steer control set-point value, in the manner described in more detail hereinafter with reference to FIGS. 2 and 3.

Manouvering of the two clutch devices 14 and 24 and of the two brake devices 11 and 23, effected simultaneously with the aid of the clutch control 4 and the brake control 5, in order respectively to disengage the drive motor and to brake the vehicle, irrespective of any possible steering manouver, can be accomplished through separate brake circuits, the broken lines extending from the pedals 4 and 5 indicating hydraulic connections to the clutch devices and brake devices respectively, optionally also symbolized by the broken-line arrows to blocks 13, 14, 23 and 24. Alternatively, the controls 4 and 5 may be arranged to act on the clutch and brake devices through the control unit 9, so as to change the function thereof when depressed.

In the case of the embodiment of the invention illustrated in FIG. 1, the hydraulic steering control pressure is primarily changed incrementally for a clutch device that coacts with the left or the right traction devices, whereas the hydraulic steering control pressure for a braking device serving the same traction device is, on the other hand, changed so that no braking effect is achieved until it is found that a given incremental change in the hydraulic steering control pressure to said clutch device is insufficient to steer the vehicle in the manner desired. Furthermore, when changing a hydraulic steering control pressure to one device, the steering control pressure shall be changed within certain limits incrementally in one given specific direction for as long as the comparison between the steer control real-value and the steer control set-point value indicates that the total change in steering control pressure is too small for the steer control real-value to coincide wtih the steer control set-point value, and in the reverse direction for as long as the comparison indicates that the total change in steering control pressure is too large for the steer control real-value to be made to coincide with the steer control set-point value. Depending on the type of brake/clutch device used, and also on the steer control set-point value, this specific direction may be upwards or downwards, and may be different in respect of devices belonging to respective left and right traction devices. This is explained in more detail hereinafter, with reference to the embodiment of FIGS. 2 and 3.

Figure 2:
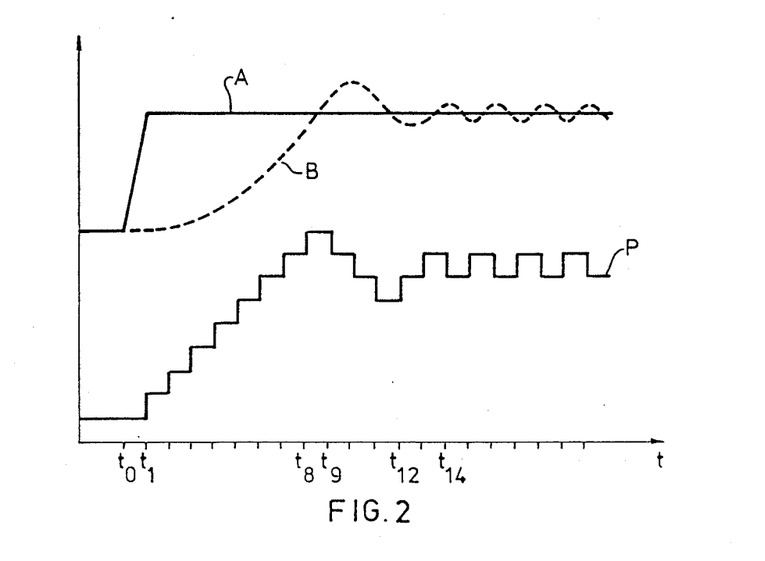
FIG. 2 is a simplified illustration of a first steer control set-point value and a corresponding steer control real value, and also illustrates an incremental change in a hydraulic steering control pressure as a function of time t.

FIG. 2 illustrates an imaginary first steer control set-point value and an imaginary first steer control real-value, and also illustrates an incremental change in the hydraulic steering control pressure for the right clutch device as a function of time. The illustrated values and said change are assumed to relate to a slight/slow right-hand vehicle turn, i.e. a turn having a high radius of curvature, and are not shown to imitate reality, but primarily to illustrate in a simple and easily understood manner how the hydraulic steering control pressure is changed as a function of the steer control real-value and the steer control set-point value. Since FIG. 2 is concerned with a gentle right turn, which can solely be effected by activating the right clutch device, the steering control pressure to the right brake device, and naturally also to the left clutch and brake devices, is left unchanged. Thus, the turn is effected with full drive and without braking the left traction device.

In FIG. 2, the upper full-line curve illustrates the magnitude of the steer control set-point value, A. The upper broken-line curve illustrates the magnitude of the steering control real-value, B, and the lower stepped-line curve illustrates the magnitude of the steering control pressure, P, for the right clutch device. The time $t_0$ at which the steer control set-point value is changed for the first time and the time point $t_1, t_2 \ldots t_{20}$ at which the hydraulic steering control pressure is changed incrementally are shown on the abscissa, i.e. the time axis, by means of short dashes. For reasons of space, only some of the time points in FIG. 2 have been allocated references.

According to FIG. 2, the steer control real-value and the steer control set-point value are initially constant and of the same order of magnitude, which may be due to the fact that the vehicle is to be driven straight ahead on smooth ground, without causing any of the traction devices to skid on the surface thereof. At time $t_0$ the steer control set-point value begins to rise rapidly, and immediately after passing $t_0$ returns to a constant value, although at a much higher level than prior to the time $t_0$. Consequently, immediately after passing the time $t_0$, the steer control set-point value is significantly greater than the steer control real-value.

The steering control pressure is constant prior to the time $t_0$, and lies at a minimum level which may be zero (0) although not necessarily so. The control unit is constructed to compare the steer control real-value with the steer control set-point value and, in response to this comparison, possibly change the steering control pressure in increments at regular time intervals. When the steering control pressure is at a minimum or maximum value, it is not possible to lower or to raise the pressure still further, and hence the steering control pressure is constant prior to the time $t_0$. When the steer control set-point value becomes significantly higher than the steer control real-value, immediately after the time $t_0$, the control unit raises the steering control pressure one increment on the first opportunity, which in FIG. 2 is at the time point $t_1$. If the steer control set-point value after $t_1$ is still greater than the steer control real-value immediately prior to $t_2$, the control unit effects a further increase in steering control pressure through one increment at the first opportunity, which is at time point $t_2$. The control unit continues to increase the steering control pressure incrementally in a similar manner up to the time point $t_8$. The steer control realvalue begins to rise over this time period, first slowly and then rapidly, and progressively approaches more closely to the set-point value. This is due to the fact that the right clutch device activated by the steering control pressure has decreased the power transmission from the drive motor to the right traction devices. Immediately after time $t_8$ and prior to the time $t_9$, the magnitude of the steer control real-value is greater than that of the steer control set-point value. At the next time point, $t_9$, for an incremental change in the steering control pressure of the right clutch device, the direction in which the pressure is changed is switched from a pressure increase to a pressure decrease direction. The steer control real-value is also greater than the steer control set-point value at the two immediately following time points $t_{10}$ and $1_{11}$, and hence the steering control pressure is lowered one increment at each of the time points $t_{10}$ and $t_{11}$. This incremental decrease in the steering control pressure at time points $t_9$, $t_{10}$, $t_{11}$ results in a gradual decrease of the steer control real-value, so that after time point $t_{11}$ the steer control real-value is again smaller than the steer control set-point value. Consequently, the next time the control unit has to change the steering control pressure, the change is effected in the reverse sense, from a decrease to an increase in pressure. Depending on the result obtained when making the comparison between the real pressure value and the set-point value, the steering control pressure is thereafter increased incrementally at the time points $t_{13}$, $t_{15}$, $t_{17}$ and $t_{19}$, and is lowered incrementally at the time points $t_{14}$, $t_{16}$, $t_{18}$ and $t_{20}$.

Figure 3:
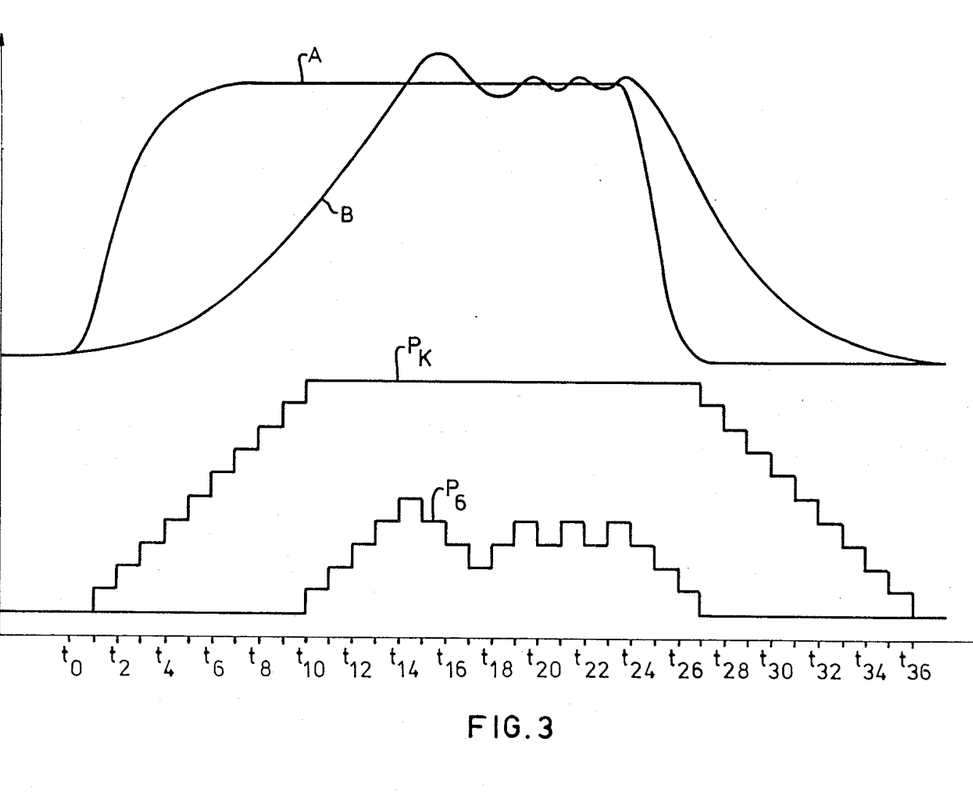
FIG. 3 is a simplified illustration of a second steer control set-point value and a corresponding second steer control real value, and also illustrates incremental changes in a hydraulic steering control pressure for a clutch device and in a hydraulic steering control pressure for a brake device.

FIG. 3 illustrates a steering sequence which differs from the steering sequence of FIG. 2, primarily in that the steer control set-point value is initially much greater than the FIG. 2 value, and returns to its original magnitude after a period of time has elapsed. Distinct from FIG. 2, the steer control set-point value of FIG. 3 is so high that it is not sufficient solely to steer or operate the clutch device, but that the brake must also be operated in order to achieve a sufficiently tight turn, i.e. a turn of sufficiently small radius of curvature. FIG. 3 illustrates thereafter four curves. Of the two uppermost curves, the curve A represents the steer set-point value, whereas the curve B represents the steer control real-value. Of the stepped curves, the upper curve $P_k$ represents the steering pressure of a clutch device, e.g. the left clutch, whereas the lower curve $P_b$ represents the steering pressure of the brake device associated with the same traction device as said clutch.

FIG. 3 shows that the steer control set-point value increases rapidly from the time $t_0$, which results in an incremental increase of the steering control pressure $p_k$ for the clutch device, starting from the time $t_0$. Because the steer control set-point value continues to be higher than the steer control real-value, the control unit continues to step-up the steering pressure $P_b$ until reaching the time point $t_{10}$, at which the steering pressure $p_k$ has reached its maximum level, above which no further increase can be made. The steering pressure $P_b$ for the brake device is not changed during the time up to and including the time point $t_9$, but remains constant at its lowest possible level. However, since the steer control real-value is still not as large as the steer control set-point value subsequent to the incremental increase of $P_k$ at $t_9$, the steering pressure $P_b$ for the brake is also increased one increment at the time point $t_{10}$. The control unit then continues to step-up, i.e. increase incrementally, the steering pressure $P_b$ at time points $t_{11}$, $t_{12}$, $t_{13}$ and $t_{14}$. However, immediately after the time point $t_{14}$ the steer control real-value has increased to such extent as to be larger than the steer control set-point value. At the next pressure change occasion, i.e. time point $t_{15}$, the direction in which the incremental change in pressure is effected is thereafter switched from an increasing to a decreasing sense. At the time points $t_{15}$, $t_{16}$ and $t_{17}$, at which the steer control real-value is greater than the steer control set-point value, the steering pressure $P_b$ is thereafter lowered one increment at a time. As a result of this lowering of the steering pressure $P_b$, the steer control real-value is again smaller than the steer control set-point value immediately after the time point $t_{17}$, and hence the direction in which in the incremental pressure changes are made is again reversed. The same sequence of pressure changes as that illustrated in FIG. 2 is then carried out, up to and including the time point $t_{23}$. The steer control set-point value begins to fall rapidly, however, between the time points $t_{23}$ and $t_{24}$, to then stabilize approximately at time point $t_{26}$ to the starting level prevailing prior to the time point $t_0$. Consequently, the steering pressure $P_b$ is also stepped down at time points $t_{25}$, $t_{26}$ and $t_{27}$, in addition to being stepped down at time point $t_{24}$ due to the fact that the steer control set-point value falls more rapidly than the steer control real-value, despite the decrease in pressure $P_b$. Since subsequent to lowering $P_b$ at $t_{26}$ the steer control real-value is still greater than the steer control set-point value, the clutch pressure $P_k$ is also decreased by one increment at time $t_{27}$, in addition to the decrease in brake pressure $P_b$. The brake pressure $P_b$ is at its minimum level at time point $t_{27}$ and times thereafter, and cannot therefore be further decreased. On the other hand, the control unit continues to step down, i.e. decrease in increments, the clutch pressure $P_k$ at time point $t_{28}$, and at a number of following time points, since the steer control real-value is greater than the steer control set-point value the whole time. Subsequent to decreasing the clutch pressure $P_k$ at time point $t_{36}$, the clutch steering pressure is at its minimum level and cannot therefore be lowered further. The steer control real-value is also equally as large as the steer control set-point value immediately after time point $t_{36}$.

It is again emphasized that the purpose of FIG. 3 is to facilitate an understanding of the steering control method according to the invention and of the function of the control unit, and is not intended to reproduce the course taken by a curve that is representative of the actual conditions which prevail when driving a motor vehicle. Furthermore, there are many ways in which modifications can be conceivably carried out to the subject illustrated in FIG. 3 and described above. For example, the changes in steering pressure need not always be based on a minimum level at low steering pressures. Depending on the construction of the clutch devices and the brake devices, the changes may instead conceivably be effected with a starting point from a maximum level of high pressure. Furthermore, it is not necessary for the changes in the clutch steering pressure $P_k$ and in the brake steering pressures $P_b$ associated with one and the same traction devices to overlap one another by precisely one time interval and one increment. It is conceivably possible for this overlap to be made larger with regard to time and size, by starting the incremental increase in brake pressure $P_b$ at a time-point earlier than $t_{10}$, e.g. at $t_9$. It is also conceivable to dispense with an overlap altogether, depending on the number of increments between the minimum value of a steering pressure and the maximum value thereof, the size of the increments, the length of the time interval, and the construction of the clutch and brake devices. A certain degree of overlap is to be preferred, however, in the case of certain clutch and brake devices. In this case, the overlap between the changes in steering pressure can be utilized to steer a brake from a rest position to a preparatory position. The rest position may then be a position in which there is positively no braking effect and therewith no wear on the brake device. The preparatory position may be one in which braking has just began to take effect, but only to a negligible extent, such that a given amount of wear on the brake device can be expected. A given braking effect can then be positively obtained, upon changing the steering pressure by one increment, from the preparatory position. A suitable overlap will therewith afford improved continuity between incremental changes in steering pressures and a corresponding effect on the steer control real-value, through clutch and brake action.

A method or an arrangement according to the invention may, to advantage, be devised or constructed in a manner which enables changes to be made to the magnitude and/or tempo of the increments. These can then be adapted to the various conditions which prevail in mutually different motor vehicles, for example such conditions or parameters as the mass of the vehicle, the construction of the traction devices, the construction of the brakes and the clutches, the steer control unit, etc. The tempo, i.e. the temporal distance between two consecutive incremental changes, is significant to the speed at which the vehicle will react to changes of the steer control set-point value. It is also conceivable that reasons may be found to vary the tempo and/or the size of the increments in time when steering one and the same vehicle, e.g. in dependence on the coefficient of friction on the driving surface or on the general nature of the surface in other respects. It is also conceivable that reasons may be found for making the tempo or the size of the increases dependent on the vehicle speed. A stationary vehicle of the kind in question in which the drive motor is not switched on will not normally turn even if the left or right clutch and/or brake devices are manouvered. Consequently, in the case of a stationary vehicle the size of the increments may be zero (0) and/or the tempo may be extremely slow, i.e. the temporal distance between two time points $t_n$ and $t_{n+1}$ may be very long. Alternatively, the steer control set-point value applied in a method or an arrangement according to the invention may be made dependent on vehicle speed, such that said set-point has a value which corresponds to forward or reverse vehicle movement, irrespective of whether or not the steering device is manipulated with the vehicle stationary or with the vehicle moving at a certain speed within a given limit. It is also conceivable to make the maximum value and/or the minimum value of a steering control pressure dependent on the speed of movement of the traction devices. Under stationary conditions, the maximum value will not then be appreciably greater than the minimum value or, e.g., only one increment greater than the minimum value, so that neither the clutch device nor the brake device are influenced to any appreciable extent by the steering device under stationary conditions. If the speed of movement of at least the left or the right traction devices should exceed a minimum speed, the difference between the minimum value and the maximum value of a steering control pressure would then, on the other hand, correspond to a large number of increments, e.g. a three-digit number.

In certain cases an advantage may be gained by establishing greater changes in the steering control pressure of a brake device more quickly than the speed obtained through the incremental change effected at a given tempo. For example, if the driver of the vehicle wishes to turn the vehicle quickly, through a turn which is so tight that, as experience has shown, it is not normally sufficient merely to disengage one traction device, but that normally the disengaged traction device must also be heavily braked, the method illustrated in FIG. 3 may be found unnecessarily slow. Consequently, in accordance with a preferred embodiment of the invention, when the steer control set-point value lies outside certain limits, there is effected directly in the hydraulic steering control pressure of the clutch device a pressure change which is much larger than the pressure change corresponded by one step or increment in FIG. 3. This pressure change is preferably sufficient to disengage the traction device substantially completely from the drive motor. Simultaneously therewith, or soon thereafter, pressure changes are also made to the brake steering pressure, so as to obtain a braking action. These pressure changes can thereafter be made in a manner analogous with FIG. 3. Similarly, should the driver wish to return quickly from a tight turn to vehicle movement straight ahead, it is also conceivable to create directly in the hydraulic steering pressure for the brake a pressure change of a much larger size than that corresponding to one step or increment in FIG. 3, and at the same time, or soon thereafter, create pressure changes in the hydraulic steering control pressure for the clutch device, analogous with FIG. 3.

Figure 4:
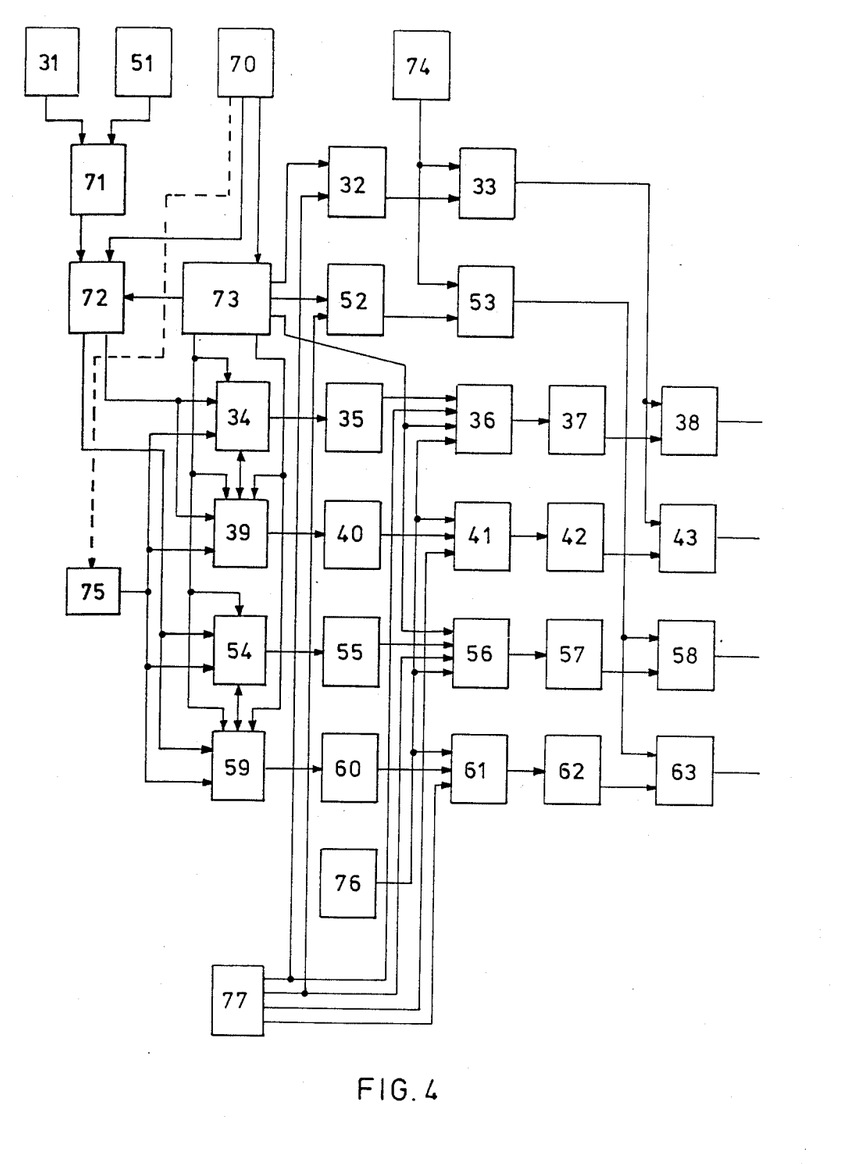
FIG. 4 is a block diagram illustrating preferred embodiments of a method and an arrangement according to the invention.

It is important that a steering method and a steering arrangement are devised and constructed so that steerability is also maintained during a braking operation, and so as to avoid the occurrence of so-called slip-stick effect in the valve slides. When the steering action is obtained through an electronic system incorporated to this end in the control unit, it is also desirable to retain a moderately good steering action through mechanical-hydraulic means in the event of a malfunction in the electronic system necessitating disengagement of said system. FIG. 4 illustrates an embodiment of the invention in which these circumstances have been taken into account.

The output magnitudes shown in the block diagram of FIG. 4 are hydraulic steering control pressures emanating from the electrically controlled pressure regulating valves 38, 43, 58 and 63 and intended for the left clutch, the left brake, the right clutch and the right brake respectively. Pressure differences are created in these steering control pressures in response to output signals from the rotational speed sensor 31 representing the speed of the right drive shaft, the rotational speed sensor 51 representing the speed of the left drive shaft, and the set-point sensor 70 representing the steer control output. The output signals of the sensors 31 and 51 are applied to a steer control real-value device in the form of a subtractor 71, in order to establish a steer control real-value that represents the speed differential between the two drive shafts, this steer control real-value being passed to a comparison device 72. The steer control set-point value obtained from the set-point sensor 70 is passed to the comparison device 72 and also to a direction and size discriminator 73, which has an output connected to an input of the comparison device 72. The discriminator 73 also has a number of outputs connected to inputs on a binary counter 34 for the left clutch, a binary counter 39 for the left brake, a binary counter 54 for the right clutch, a binary counter 59 for the right brake, a driving stage 32 to the left pressure valve 33, a driving stage 52 for the right pressure valve 53, a summing device 36 for the left clutch and a summing device 56 for the right clutch. The comparison device 72 has two outputs, of which one is connected to a steer control input on the binary counter for the left clutch and the binary counter for the left brake, whereas the other output is connected to a steer control input for the right clutch and the binary counter for the right brake. A clock-pulse generator or source 75 supplies clock pulses to clock-pulse inputs of the binary counters 34, 39, 54 and 59. For the purpose of transferring information relating to the prevailing count content, each of the binary counter outputs is connected to a respective D/A-converter 35 for the left clutch, a D/A-converter 40 for the left brake, a D/A-converter 55 for the right clutch, and a D/A-converter 60 for the right brake. Each of the outputs of the D/A-converters is connected to a summing device 36 for the left clutch, a summing device 41 for the left brake, a summing device 56 for the right clutch, and a summing device 61 for the right brake, in order to supply to respective summing devices a voltage which is proportional to the counting result in respective binary counters. The inputs of the summing devices also have connected thereto an output of a ripple generator 76 and different outputs of a set-point sensor 77 for the footbrake or service brake of the vehicle. Two of the outputs of the set-point sensor 77 are also connected to the drive stages 32 and 52 of the pressure valves. Finally, a hydraulic pressure source 74 is connected for supplying high-pressure hydraulic fluid to each of the pressure valves 33 and 53.

When the vehicle steering device is moved from a position corresponding to straight ahead driving to a position indicating a turn to the left or to the right, the comparison device obtains a steer control set-point value from 70 and a steer control real-value from 71, and compares these values. In dependence on the result of this comparison and on steering direction information arriving from 73, the comparison device 72, via its outputs, will steer either the counters 34 and 39 for upward or downward counting of the clock pulses, or the counters 54 and 59 for upward or downward counting of said clock pulses. If the set-point value lies within given limits, the direction and size discriminator 73 will not, via one of its inputs, directly activate the binary counters 30 and 59 to effect a counting process. In this case the counter 39 is not activated to its counting mode until the count made in the counter 34 has reached a predetermined value, e.g. a maximum value, and the counter 59 is not activated to its counting mode until the binary counter 54 has reached a predetermined value, e.g. a maximum value, this control procedure being effected through a connection between the binary counters 34 and 39 and a connection between the binary counters 54 and 59 respectively. Consequently, when the steer control real-value lies within certain given limits, only the counter 34 or only the counter 54 will change its count content upwards or downwards at a rate or tempo determined by the clock pulse source 75, and in a counting direction determined by 72, for as long as the predetermined maximum value is not reached. If, and when, the maximum value is reached, the counter 39 or the counter 59 will start to count, while the count content of the respective counters 34 and 54 will remain unchanged in principle until the count content of the counters 34 or 54 has returned to a starting level, e.g. a minimum level, due to the connections between the counters. If the steer control set-point value does not lie within the aforesaid limits, 73 will activate the counters 39 and 59 so as to cause said counters to count irrespective of the content of the counters 34 and 54 respectively. In this case, a voltage is also applied to the summing devices 36 and 56 from one of the outputs of the direction and size discriminator 73, this voltage being of the same order of magnitude as the output voltage from the D/A-converters 35 and 55 when the count content of the respective binary counters 34 and 54 reaches the predetermined value.

A hydraulic pressure source 74 supplies high-pressure to the electrically controlled pressure valves 33 and 53, the pressure of said fluid being at least as high as the highest possible steering pressure. When the steer control set-point value indicates a left turn, the device 73 will send a signal to the driving stage 32, which in response thereto opens the left pressure valve 33, so that hydraulic fluid under high pressure is delivered to the pressure regulating valves 38 and 43. Either one, or both, of the pressure regulating valves can then be steered by respective drive stages 37 and 42 in a manner to deliver steering pressure to the left clutch and the left brake respectively. The magnitude of this steering control pressure is dependent on the drive current delivered by respective drive stages, the magnitude of the drive current being determined by the output voltages of respective summing devices 36 and 41. When the steer control set-point value indicates a right turn instead, the device 73 will send a signal to the drive stage 52 instead, which will therewith open the right pressure valve 53, so that the pressure regulating valves 58 and 63 are, instead, supplied with high-pressure hydraulic fluid, from the source 74. In this case either one, or both, of the pressure regulating valves 58 and 63 of respective drive stages 57 and 62 are steered in a manner to supply steering control pressure to the right clutch and the right brake respectively. The magnitude of these steering control pressures then depends on the drive current from respective drive stages, the magnitude of this current being dependent on the output voltage of respective summing devices 56 and 61. Thus, the device 73 opens the pressure valves 33 and 53 solely one at a time. On the other hand, the set-point sensor 77, which is connected to both drive stages 32 and 52, is arranged so as to be able to open both pressure valves 33 and 53 simultaneously, so that in this case all four pressure regulating valves 38, 43, 58 and 63 are supplied with hydraulic fluid from the pressure source 74. Because the outputs of the set-point sensor are also connected to all four summing devices, the set-point sensor 77 is able to cause steering control pressure to be produced from all four pressure regulating valves, irrespective of any possible set-point value. When the vehicle brake control device is activated, the output voltages from the sensor 77 to the summing devices 36 and 56 are such as to ensure that the steering control pressures applied to the left clutch and to the right clutch are sufficient to disengage the traction devices from the drive motor independently of any possible set-point value. The magnitude of the output voltages from the sensor 77 to the summing devices 41 and 61 varies with the extent to which the brake control device is activated, and is sufficient for the steering control pressures for the right and left brakes to produce an equal braking effect on both the left and right traction devices in the absence of a set-point value, the magnitude of this braking effect varying with the varying extents to which the brake control device is activated.

If the set-point value lies within the aforesaid limits and the content of the counters 34 and 54 has not reached the predetermined value, only the count content of the counter 34 or the counter 54 is changed in tempo with the clock pulses. If the brake control device is not activated the count content is able to create pressure changes in the steering control pressure for the left clutch, through the D/A-converter 35, the summing device 36, the drive stage 37 and the pressure regulating valve 38, or to create pressure changes in the steering control pressure for the right clutch, through the D/A-converter 55, the summing device 56, the drive stage 57 and the pressure regulating valve 58. On the other hand, when the count content of the counters 39 and 59 is constant, no changes are made in the steering control pressure for the left or the right brake.

When the steer control set-point value does not lie within the aforesaid limits and/or the count content of the counter 34 or the counter 54 has reached the predetermined value, the content of the counter 39 or the counter 59 will be counted up or counted down in keeping with the clock pulses. If the brake control device is not activated, changes in the count content of the counter 39, in the case of a left turn, can cause changes to be made in the steering control pressure to the left brake, via the D/A-converter 40, the summing device 41, the drive stage 42, and the pressure regulating valve 43. At the same time, the voltage applied to the summing device 36 from the device 73 causes the steering control pressure for the left clutch to be such as to effect disengagement of the left traction device. In the case of a right turn, changes in the count content of the counter 59 may produce pressure changes in the steering control pressure for the right brake instead, these changes being effected through the D/A-converter 60, the summing device 61, the drive stage 62 and the pressure regulating device 63. At the same time the voltage supplied to the summing device 56 from the device 73 will cause the steering control pressure for the right clutch to be such as to ensure that the right traction device is disengaged from the drive motor.

The summing devices are arranged to produce, at least within a given voltage range, an output voltage which is dependent on the sum of the input voltages of respective inputs of the summing devices. When the steering device and the brake control device are both activated or manipulated simultaneously for moderate braking action in conjunction with a turn, a pressure change caused by activation of the steering device in the steering control pressure for the left brake for instance, depending on the direction of the turn, can be superimposed on a pressure change in the steering control pressure for the left brake, caused by activation of the brake control device. When making a left turn, the steering control pressure for the right brake is changed at the same time only in response to activation of the brake control device. Consequently, the respective steering control pressures for the right and the left brakes are mutually different, therewith maintaining steerability during moderate braking. Since the vehicle drive is disengaged during a braking action, as hereinbefore described, steering is effected solely through pressure changes in the steering control pressure for the brake devices when the vehicle is braked.

The ripple generator 76 is constructed to supply a small, varying voltage to the adders 36, 41, 56 and 61, so as to superimpose a small reciprocating movement on the valve slides of the pressure regulators, such as to prevent the slides from slipping and sticking, i.e. the occurrence of a so-called slip-stack effect.

In the case of certain embodiments of the invention it may be desirable to be able to vary the frequency of the clock pulse source 75, e.g. as a function of the steering control set-point value. One such alternative embodiment is illustrated in FIG. 4, and by the chain line extending between the set-point sensor 70 and the clock pulse generator or source 75.

In order to prevent the count content of the binary counters from lagging when the set-point value changes rapidly, e.g. with rapid transition from a left turn to a right turn, or vice versa, it may be to advantage to permit the device 73 to set certain of the binary counters, or all binary counters, to zero, or to re-set said counters, when the steering control device is located in a neutral position for driving in a forward or reverse direction, or when the steering control set-point value takes, or passes, a corresponding neutral value. In this case, the device 73 is connected to a zero-setting or re-setting input of respective binary counters.

Although not shown in FIG. 4, there is advantageously incorporated a parallel-connected mechanical-hydraulic steering system, which functions as a back-up safety system for application in the event of a malfunction in the devices responsible for effecting the aforesaid changes in steering control pressures, these devices being predominantly electronic devices. This back-up system incorporates a given degree of lost motion, or like delay facility, so as to not to disturb the electronic system when said system functions satisfactorily. In the mechanical-hydraulic steering control system the steering control device is connected mechanically to the pressure valves and to the pressure regulating valves with a certain degree of lost motion. Consequently, when steering the vehicle the slides in the pressure regulating valves will be activated purely mechanically subsequent to taking-up the lost motion in the mechanical-hydraulic steering system, this activation of the slides being effected in a sequence in which firstly respective clutches are disengaged and subsequently respective brakes are activated. The extent to which the valve slides are activated will thus depend directly on the extent to which the steering device is activated, and will not depend upon the result of a comparison made between the steer control real-value and the steer control set-point value.

The curve forms illustrated in FIGS. 2 and 3 are also, in the main, representative of conceivable pressure changes in steering control pressures produced through an embodiment according to FIG. 4. Due to the inherent deficiencies and limitations of electric circuits and hydraulic systems, the pressure changes will not, of course, occur in precisely the instantanous manner as that illustrated in FIGS. 3 and 4 when making tight turns. Furthermore, FIG. 3 shows no direct, large pressure change between a minimum value and a maximum value of the steering control pressure for a clutch device such as that effected via the sensor 77 or the device 73 in the FIG. 4 embodiment when braking the vehicle or when the steer control set-point value does not lie within given limits.

I claim:

1. A method for steering a motor-driven road vehicle in which steering of the vehicle for straight ahead vehicle movement or for turning of the vehicle to the left or to the right is effected in response to activation of a steering device by causing left and right traction devices to move at the same or at different speeds, said vehicle incorporating clutch devices operative to enable variable power transmission to be established between a drive motor and the left and right traction devices, respectively, and brake devices which are operative to establish a variable braking effect on the left and the right traction devices, respectively, and further incorporating sensors for producing signals indicative of the speed of the respective left and right traction devices, said method comprising the steps of (a) generating a steer control set-point value with the aid of the steering control device;

(b) generating a steer control real-value with the aid of the signals produced by the sensors;

(c) comparing the steer control set-point value with the steer control real-value;

(d) activating the clutch and/or brake devices associated with respective left and right traction devices so that the steer control real value approaches the steer control set-point value;

(e) steering the vehicle with the aid of pressure changes effected in individual hydraulic steering control pressures for respective clutch devices and brake devices;

(f) creating primarily pressure changes in a hydraulic steering control pressure for a clutch device associated with a left or right traction device in a directional sense corresponding to the result of the comparison made between the steer control set-point value and the steer control real-value, said pressure changes being effected at least when the steer control set-point value lies within given limits;

(g) effecting, at least when the steer control set-point value lies within said given limits, pressure changes in a hydraulic steering control pressure for a brake device from a pressure having no braking effect to a pressure at which a braking effect is obtained solely when changes to the hydraulic steering control pressure for the clutch device associated with the same traction devices have been found insufficient to accomplish movement of the vehicle in the manner desired;

(h) increasing respective hydraulic steering pressures between a minimum and a maximum value for as long as the aforesaid comparison indicates that the total steering control pressure is too low for the steering control real-value to coincide with the steer control set-point value;

(i) lowering respective steering control pressure for a long as said comparison indicates that the total steering control pressure is too high for the steer control real-value to coincide with the steering control set-point value; and (j) wherein the pressure changes are comprised of substantially incremental pressure increases and/or pressure decreases effected at a given rate.

2. A method for steering a motor-driven road vehicle in which steering of the vehicle for straight ahead vehicle movement or for turning of the vehicle to the left or to the right is effected in response to activation of a steering device by causing left and right traction devices to move at the same or at different speeds, said vehicle incorporating clutch devices operative to enable variable power transmission to be established between a drive motor and the left and right traction devices, respectively, and brake devices which are operative to establish a variable braking effect on the left and the right traction devices, respectively, and further incorporating sensors for producing signals indicative of the speed of the respective left and right traction devices, said method comprising the steps of (a) generating a steer control set-point value with the aid of the steering control device;

(b) generating a steer control real-value with the aid of the signals produced by the sensors (c) comparing the steer control set-point value with the steer control real-value;

(d) activating the clutch and/or brake devices associated with respective left and right traction devices so that the steer control real value approaches the steer control set-point value;

(e) steering the vehicle with the aid of pressure changes effected in individual hydraulic steering control pressures for respective clutch devices and brake devices;

(f) creating primarily pressure changes in a hydraulic steering control pressure for a clutch device associated with a left or right traction device in a directional sense corresponding to the result of the comparison made between the steer control set-point value and the steer control real-value, said pressure changes being effected at least when the steer control set-point value lies within given limits;

(g) effecting, at least when the steer control set-point value lies within said given limits, pressure changes in a hydraulic steering control pressure for a brake device from a pressure having no braking effect to a pressure at which a braking effect is obtained solely when changes to the hydraulic steering control pressure for the clutch device associated with the same traction devices have been found insufficient to accomplish movement of the vehicle in the manner desired;

(h) increasing respective hydraulic steering pressures between a minimum and a maximum value for as long as the aforesaid comparison indicates that the total steering control pressure is too low for the steering control real-value to coincide with the steer control set-point value;

(i) lowering respective steering control pressure for as long as said comparison indicates that the total steering control pressure is too high for the steer control real-value to coincide with the steering control set-point value; and (j) maintaining the tempo at which a hydraulic steering control pressure is changed substantially constant irrespective of the difference in magnitude between the steer control real-value and the steer control set-point value.

3. A method for steering a motor-driven road vehicle in which steering of the vehicle for straight ahead vehicle movement or for turning of the vehicle to the left or to the right is effected in response to activation of a steering device by causing left and right traction devices to move at the same or at different speeds, said vehicle incorporating clutch devices operative to enable variable power transmission to be established between a drive motor and the left and right traction devices, respectively, and brake devices which are operative to establish a variable braking effect on the left and the right traction devices, respectively, and further incorporating sensors for producing signals indicative of the speed of the respective left and right traction devices, said method comprising the steps of (a) generating a steer control set-point value with the aid of the steering control device;

(b) generating a steer control real-value with the aid of the signals produced by the sensors;

(c) comparing the steer control set-point value with the steer control real-value;

(d) activating the clutch and/or brake devices associated with respective left and right traction devices so that the steer control real value approaches the steer control set-point value;

(e) steering the vehicle with the aid of pressure changes effected in individual hydraulic steering control pressures for respective clutch devices and brake devices;

(f) creating primarily pressure changes in a hydraulic steering control pressure for a clutch device associated with a left or right traction device in a directional sense corresponding to the result of the comparison made between the steer control set-point value and the steer control real-value, said pressure changes being effected at least when the steer control set-point value lies within given limits;

(g) effecting, at least when the steer control set-point value lies within said given limits, pressure changes in a hydraulic steering control pressure for a brake device from a pressure having no braking effect to a pressure at which a braking effect is obtained solely when changes to the hydraulic steering control pressure for the clutch device associated with the same traction devices have been found insufficient to accomplish movement of the vehicle in the manner desired;

(h) increasing respective hydraulic steering pressures between a minimum and a maximum value for as long as the aforesaid comparison indicates that the total steering control pressure is too low for the steering control real-value to coincide with the steer control set-point value;

(i) lowering respective steering control pressure for as long as said comparison indicates that the total steering control pressure is too high for the steer control real-value to coincide with the steering control set-point value; and (j) varying the tempo at which a hydraulic steering control pressure is changed as a function of the steer control real-value, or as a function of the speed of the vehicle or of the traction devices.

4. A method for steering a motor-driven road vehicle in which steering of the vehicle for straight ahead vehicle movement or for turning of the vehicle to the left or to the right is effected in response to activation of a steering device by causing left and right traction devices to move at the same or at different speeds, said vehicle incorporating clutch devices operative to enable variable power transmission to be established between a drive motor and the left and right traction devices, respectively, and brake devices which are operative to establish a variable braking effect on the left and the right traction devices, respectively, and further incorporating sensors for producing signals indicative of the speed of the respective left and right traction devices, said method comprising the steps of (a) generating a steer control set-point value with the aid of the steering control device;

(b) generating a steer control real-value with the aid of the signals produced by the sensors;

(c) comparing the steer control set-point value with the steer control real-value;

(d) activating the clutch and/or brake devices associated with respective left and right traction devices so that the steer control real value approaches the steer control set-point value;

(e) steering the vehicle with the aid of pressure changes effected in individual hydraulic steering control pressures for respective clutch devices and brake devices;

(f) creating primarily pressure changes in a hydraulic steering control pressure for a clutch device associated with a left or right traction device in a directional sense corresponding to the result of the comparison made between the steer control set-point value and the steer control real-value, said pressure changes being effected at least when the steer control set-point value lies within given limits;

(g) effecting, at least when the steer control set-point value lies within said given limits, pressure changes in a hydraulic steering control pressure for a brake device from a pressure having no braking effect to a pressure at which a braking effect is obtained solely when changes to the hydraulic steering control pressure for the clutch device associated with the same traction devices have been found insufficient to accomplish movement of the vehicle in the manner desired;

(h) increasing respective hydraulic steering pressures between a minimum and a maximum value for as long as the aforesaid comparison indicates that the total steering control pressure is too low for the steering control real-value to coincide with the steer control set-point value;

(i) lowering respective steering control pressure for a long as said comparison indicates that the total steering control pressure is too high for the steer control real-value to coincide with the steering control set-point value; and (j) wherein the pressure changes are comprised of substantially incremental pressure increases and/or pressure decreases effected at a given rate;

(k) varying both a steering pressure for a clutch device and a steering pressure for a brake device between minimum values and maximum values specific for respective steering pressures; and (l) causing the incremental changes in pressure of one of the steering control pressures to overlap the incremental changes in pressure of the other of the steering control pressures, at least at one of said maximum and/or minimum values.

* * * * *